United States Patent [19]
Roth

[11] Patent Number: 5,170,168
[45] Date of Patent: Dec. 8, 1992

[54] IDENTIFICATION OF FRIEND FROM FOE DEVICE

[75] Inventor: Dieter Roth, Pforzheim, Fed. Rep. of Germany

[73] Assignee: Standard Elektrik Lorenz AG, Stuttgart

[21] Appl. No.: 686,316

[22] Filed: Apr. 16, 1991

Related U.S. Application Data

[63] Continuation of Ser. No. 336,583, Apr. 10, 1989, abandoned, which is a continuation of Ser. No. 74,957, Jul. 17, 1987, abandoned.

[30] Foreign Application Priority Data

Jul. 17, 1986 [DE] Fed. Rep. of Germany ....... 3624143

[51] Int. Cl.$^5$ .................. G01S 13/78; G01S 13/80
[52] U.S. Cl. ........................ 342/45; 342/51; 342/53; 342/54
[58] Field of Search ............ 342/45, 54, 67, 53, 342/42, 44, 51

[56] References Cited

U.S. PATENT DOCUMENTS

| | | | |
|---|---|---|---|
| 2,472,136 | 6/1949 | Whitlock | 42/45 X |
| 2,831,185 | 4/1958 | Goldbohm et al. | 342/43 |
| 2,943,315 | 6/1960 | Rosenthal | 342/181 |
| 3,104,478 | 9/1963 | Strauss et al. | 342/53 X |
| 3,169,191 | 2/1965 | Knapp | 89/41.06 X |
| 3,434,226 | 3/1969 | Schaller | 342/453 X |
| 3,514,776 | 5/1970 | Mulready | 342/54 |
| 3,911,433 | 10/1975 | Redman | 342/53 |
| 3,956,747 | 5/1976 | Leypold et al. | 342/43 |
| 3,989,942 | 11/1976 | Waddoups | 455/665 |
| 4,050,068 | 9/1977 | Berg et al. | 342/53 |
| 4,134,008 | 1/1979 | Je Corlieu et al. | 455/604 |
| 4,143,263 | 3/1979 | Eichweber | 455/606 |
| 4,144,534 | 3/1979 | Prickett et al. | 342/43 |
| 4,315,609 | 2/1982 | McLean et al. | 244/3.14 |
| 4,388,723 | 6/1983 | Keen | 375/1 |
| 4,448,106 | 5/1984 | Knapp | 89/1.11 |
| 4,566,009 | 1/1986 | Hanni et al. | 342/45 |
| 4,780,719 | 10/1988 | Frei et al. | 342/53 |
| 4,872,014 | 10/1989 | Nowogrodzki | 342/351 |
| 5,001,488 | 3/1991 | Joguet | 342/45 |

FOREIGN PATENT DOCUMENTS

| | | |
|---|---|---|
| 108643 | 5/1984 | European Pat. Off. |
| 187086 | 7/1986 | European Pat. Off. |
| 2215453 | 10/1973 | Fed. Rep. of Germany |
| 2251295 | 5/1974 | Fed. Rep. of Germany |

Primary Examiner—John B. Sotomayor
Attorney, Agent, or Firm—Christie, Parker & Hale

[57] ABSTRACT

An identification of friend from foe (IFF) device is described containing a radio transceiver (F) which, in addition to being designed for communication purposes, is equipped for transmitting, receiving, and evaluating IFF signals. The IFF device further includes a laser transmitter (LS) and an optical receiver (LE) which are coupled to the radio transceiver (F) via a controller (G). For identification, unmodulated direction-selective light signals and modulated nondirectional radio signals are used.

10 Claims, 1 Drawing Sheet

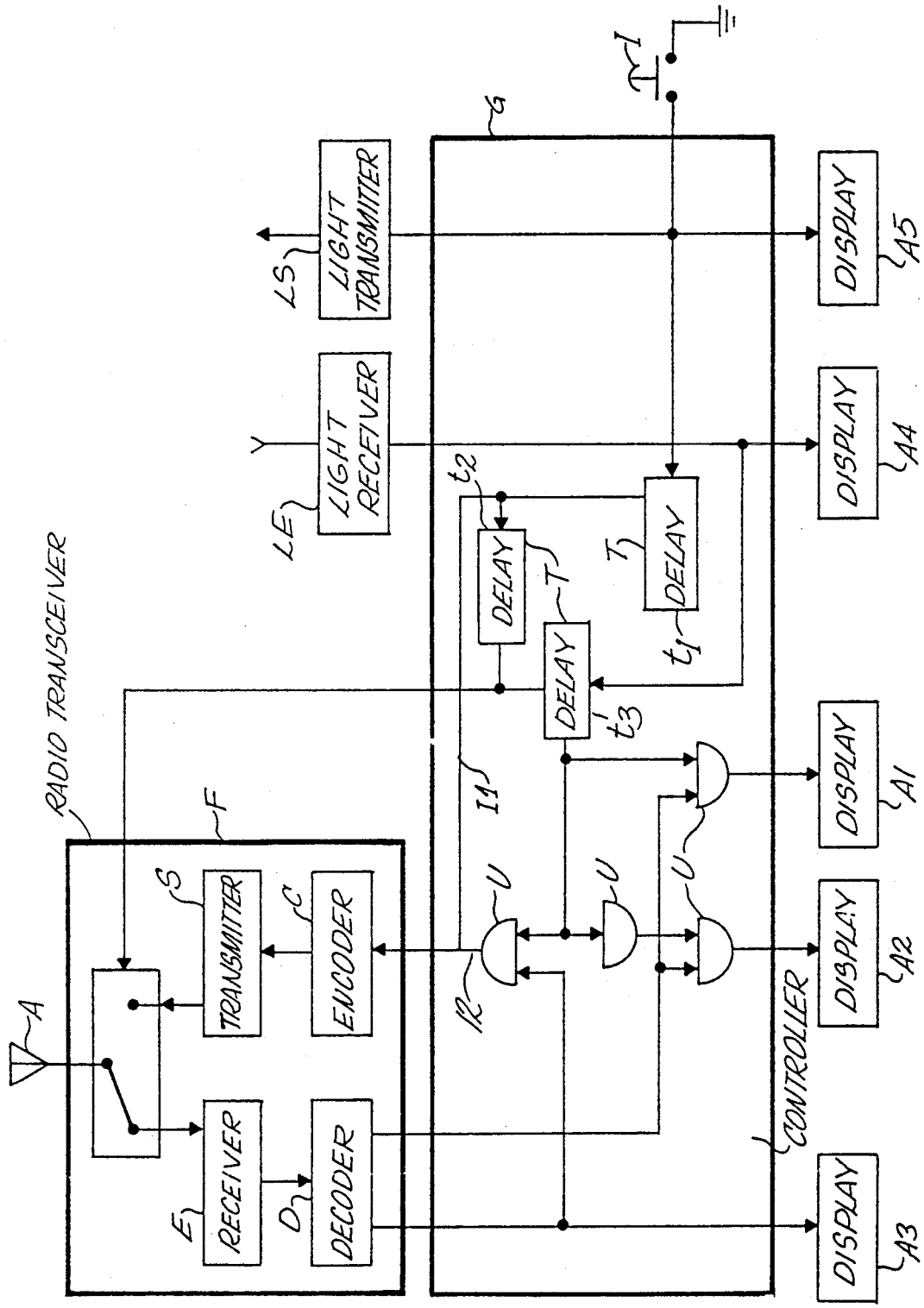

IDENTIFICATION OF FRIEND FROM FOE DEVICE

CROSS-REFERENCE TO RELATED APPLICATIONS

This is a continuation of application Ser. No. 07/336,583, filed Apr. 10, 1989 now abandoned which is a continuation of application Ser. No. 07/074,957, filed Jul. 17, 1987 now abandoned.

TECHNICAL FIELD

The present invention relates to an identification of friend from foe (IFF) device.

BACKGROUND ART

Published German patent specification DE-AS 20 05 457, discloses an exemplary IFF system which operates on the radar (particularly secondary radar) principle. In the answering unit only one of many possible interrogation codes is recognized as valid in a certain time range, whereupon an answer signal may be triggered. The answering unit stores not only the currently valid interrogation code, but also future and/or past codes. By comparing the received code with the stored codes, the answering unit may be synchronized with the interrogating unit.

German Patent 29 39 959 (which corresponds to U.S. Pat. No. 4,249,265) discloses an IFF system which operates with coded light signals. It includes an omnidirectional receiver and an optical system that selectively reflects the coded light signal in the direction of incidence.

DISCLOSURE OF INVENTION

Prior art identification of friend from foe systems (including those exemplified by the above-referenced patent publications) require costly and complicated equipment.

In contrast, the identification of friend from foe device of the present invention provides a low-cost IFF system having improved performance and reliability. It includes a radio transceiver (F) which is equipped for transmitting, receiving, and evaluating IFF signals, and which may also be used for communication, radio range-finding, and other non-IFF functions. The novel IFF device further includes a controller which is coupled to a laser transmitter and an optical receiver, which may also functionally be part of a weapon guidance and target acquisition system. For identification, unmodulated direction-selective light signals and modulated nondirectional radio signals are used.

This has the advantage that, since a significant portion of the required electronic and optical equipment is already present in a typical modern weapon system, not only a considerable cost reduction but also space savings and logistic advantages may be achieved thanks to the multiple utilization of such equipment.

BRIEF DESCRIPTION OF DRAWING

An embodiment of the invention will now be explained with reference to the accompanying Drawing,in which the only FIGURE is a schematic circuit diagram of the novel IFF device.

BEST MODE FOR CARRYING OUT THE INVENTION

The IFF device contains a radio unit F with a transmitting section S, a receiving section E, an encoder C, and a decoder D. Radio unit F may for example be a conventional VHF transceiver such as is used for secure military communications, and is connected to a conventional non-directional antenna A. It further includes a light transmitter LS, which may be a laser range finder forming part of an otherwise conventional weapon system (not shown), a light receiver LE, which may be a laser warning receiver that is also part of an otherwise conventional weapon system, a controller G, and displays A1-A5, which may be physically integrated with the controller G. The latter contains appropriate control circuit including AND gates U and an inverter stage for driving the displays A1 and A2, and three delay elements T. The other components of the controller G are not shown since they are not necessary for one skilled in the art to understand the principle of operation of the present invention, and the construction of any unshown remaining portions of the controller G will be obvious to such a skilled artisan. Connected to the controller G is a trigger I which may be operated manually to commence the identification process.

The radio transmission of the interrogation and reply signals employed in the practice of the present invention must meet certain obvious requirements with respect to communication security, deception resistance, and jam resistance. An example of a suitable transmission technique is that known as "frequency hopping".

The identification decision process commences with the transmission of interrogation signals in the form of an unmodulated laser pulse from a directional optical transmitter LS (which may be the same as that conventionally used for weapon guidance and target acquisition purposes) and modulated electronic radio frequency signals which are produced in the encoder C and which may be modulated with an interrogation code in a similar manner as that used for range measurement purposes. The interrogation code must be agreed anew from time to time (every day, for example). These interrogation signals are triggered via the trigger I.

Simultaneously with the triggering of these interrogation signals, the display "identification in progress" appears on the display unit A5.

As soon as the transmission of the electronic interrogation signal has been completed, the control circuit of the controller G of the interrogating station switches the radio unit from transmission mode to reception mode and now waits for the agreed reply signal.

When the light receiver LE of the responding station has signalled the reception of a laser pulse from any direction (optically omnidirectional "antenna"), the display "laser reception" appears on the display unit A4. At the same time, when a laser pulse is received by the light receiver LE of the responding station, the receiver E of the station's radio unit F is automatically set to a mode in which the interrogation signals can be received and evaluated. If the result of the evaluation performed in the decoder D is positive using the previously agreed code for that particular time period, i.e., if valid interrogation signals from a friendly interrogation station have been detected, the responding station's radio unit will be switched from reception to transmission in the shortest possible time. The pre-agreed coded reply signal is generated electronically by the encoder C of the radio unit of the responding station, and are then transmitted to the interrogating station, also in the frequency-hopping mode. Once the reply signal has been thus transmitted the "laser reception" warning signal on display unit A4 is cancelled.

Consider now what happens to such a reply signal when it arrives at the interrogating station. As the receiver E of the radio unit F at the interrogating station is already prepared for reception of these signals, the latter can be evaluated with a minimum delay. If the result of the evaluation of the information conveyed by the reply signals is positive, it must be assumed, in view of the fact that the reply signals are transmitted using an appropriate technique that is secure against deception, that the interrogated station has thus established that it is a friend. In this case, the display "friend" appears on the display unit A3 of the interrogating station. When the "friend" display is cancelled, the "identification in progress" display on display unit A5 also disappears. The device is then ready to carry out a new identification.

As described above, after transmission of the interrogation signals, the radio unit C of the interrogator switches from the transmit condition to the receive condition. To permit reception of a possible reply from the interrogated object, the receiver E of the interrogator attempts to detect and evaluate agreed reply signals. If this attempt is unsuccessful after a predetermined period of time, the receiver initiates the display "foe" on the display unit A2. Since the target range of the object identified as a foe may be simultaneously provided by a laser range finder of which the optical receiver LE and optical transmitter LS are also utilized as essential components, such a target can be fired upon immediately.

If a friendly weapon system equipped with an IFF device according to the invention is illuminated by the laser source of a hostile weapon system, the sequence of operations is as follows.

The laser warning receiver LE detects the illumination with laser light and causes the display "laser reception" to appear on the display unit A4. The laser warning receiver will typically also be in a position to indicate the direction from which the laser light was received. From just the laser light received in the laser warning receiver LE, it is not generally possible to reliably and unambiguously identify the transmitter. Therefore, upon receiving such laser light, the laser warning receiver LE will immediately activate the receiver E of the radio unit C, so that any accompanying electronic interrogation signal can be received and evaluated. If a friendly object is illuminated by the laser range finder of a hostile object, no valid such interrogation signal will be present.

The result of such an evaluation is available after the lapse of a predetermined time interval following the detection of the reception of laser light by the laser warning receiver LE. Based on the absence of an interrogation signal it can only be stated that the illumination with laser light came from a still unidentified object (which may be indicated on display unit A1). With the aid of the directional information provided by the laser warning receiver LE, the target can be located without a time-consuming search process. To make sure that the object is really a hostile object, an identification verification process as described above can now be initiated.

A practical IFF system should permit unambiguous identification decisions even when several identifying objects and several objects to be identified are operating within a limited geographical area. The identifying objects are friendly objects. The objects to be identified can be either friendly objects or hostile objects.

To unambiguously distinguish friend from foe, in the above-described IFF system, electronic interrogation signals are sent out by the interrogator of the novel device shortly after the laser pulse. These electronic interrogation signals are transmitted by radio in such a way as to be resistant to jamming and secure against deception. However, since they are transmitted by the interrogator via omnidirectional antennas, they can be received by any receiving station located within the coverage. Through the directional selectivity of the laser beam in the direction of interrogation, however, spatial selectivity is achieved which covers only one object to be identified. In the interrogator, therefore, the operation of the laser range finder optical transmitter LS and of the radio unit F are coordinated by the controller G to compensate for the lack of spatial selectivity of the radio antenna A used.

In the responding station, operation of the laser warning receiver LE is coordinated with that of the radio unit F. This makes it possible upon reception of laser light to put the radio unit F, irrespective of its current operating condition, in a condition in which it can receive and evaluate any interrogation signal in the intended manner. Because of the directional selectivity of the laser beam, only the object illuminated by it will respond (provided of course it is a friend).

Since the antenna A is non-directional, the station illuminated by the laser beam also radiates the reply signals in all horizontal directions. Nevertheless, because a secure transmission technique is used, the reply can only be received and evaluated by the interrogating station which initiated the identification process. All other objects within the coverage of the radio unit, which receive the reply as well, are not prepared for the reception of the reply signals, i.e., are not in the mode intended therefor. They are "deaf" to these reply signals. Thus, even in the presence of several identifying objects and several objects to be identified, selective interrogation of an object is still possible, and the reply of the interrogated object can only be evaluated by the interrogating station which initiated the identification process.

The situation just described assumes that the identification processes carried out by the individual interrogating stations are separated in time. As the number of identifying interrogators and responding objects increases, however, the identification processes of individual interrogators may overlap in time, i.e., during the identification process, an identifying object may be interrogated by another identifying object, or an object to be identified may be illuminated with laser light from a hostile weapon system.

Such overlapping situations, if critical to a particular friendly weapon system, must also be provided for. However, as described thus far, the disclosed IFF system concept does not specifically provide for an identifying object or an object to be identified (friendly weapon systems) to be additionally interrogated by another object during an initiated and partially executed identification process. Accordingly, in such a "basic" IFF system, it is possible that a received laser pulse will be registered and indicated, but any radio frequency interrogation signal transmitted simultaneously with the laser pulse may not be received by the receiver of the radio unit.

Should that be a critical limitation, an additional radio unit should be added to each IFF device. Such an "enhanced" IFF system concept will permit the interrogation signals arriving from another object during an identification process to be received and evaluated without an on-going identification sequence having to be interrupted either in the identifying object or in the object to be identified. The execution of an on-going identification process will not thereby put the identifying station to the risk of being unable to respond to another identifying station and thereby being classified as "foe". In that case, the reliability of the identification decision is not affected, and an optimum reaction time can be achieved, at the expense of an additional radio unit.

The present invention has been described above with regard to the certain presently contemplated specific embodiments of the invention. It will be appreciated to those skilled in the art that modifications and variations thereof are possible within the spirit and scope of the appended claims.

What is claimed is:

1. Communication and identification of friend from foe apparatus comprising in combination
    radio transmitter means for sending out a first outgoing coded radio-frequency interrogation signal that is not spatially selective;
    radio receiver means for receiving an incoming coded radio-frequency response signal;
    light transmitter means for sending out a first outgoing uncoded optical interrogation signal that is spatially selective and that is transmitted within a first predetermined period of time prior to the transmission of said first incoming coded radio-frequency interrogation signal; and
    IFF means for evaluating said incoming coded radio-frequency response signal.

2. The identification of friend from foe apparatus of claim 1 wherein
    said radio transmitter means and said radio receiver means are part of a VHF frequency-hopping radio communication system.

3. The identification of friend from foe apparatus of claim 1 further comprising
    light receiver means for receiving a second incoming uncoded, spatially selective optical interrogation signal;
    wherein said radio receiver means is responsive to said light receiver means and is enabled to receive a second incoming coded radio-frequency interrogation signal for said predetermined first period of time following the reception of said second incoming uncoded optical interrogation signal.

4. The identification of friend from foe apparatus of claim 3
    wherein said light receiver means includes a display for the direction from which said second incoming uncoded, spatially selective optical interrogation signal was received.

5. The identification of friend from foe apparatus of claim 3
    wherein said radio receiver means further comprises means to determine whether or not said second incoming coded ratio frequency interrogation signal received within said first period of time is a valid interrogation signal and
    said radio transmitter means sends out said incoming coded radio-frequency response signal within a second predetermined period of time following the reception by said radio receiver means of a valid said second incoming coded radio-frequency interrogation signal within said first period of time.

6. The identification of friend from foe apparatus of claim 5
    wherein said light receiver means includes means for determining the direction from which said second incoming uncoded optical interrogation signal was received;
    said light transmitter means sends out said first outgoing uncoded optical interrogation signal in the direction so-determined following the non-reception by said radio receiver means of said valid second incoming coded radio-frequency interrogation signal within said second period of time; and
    said radio transmitter means sends out said first outgoing coded radio-frequency interrogation signal during said first period of time following the transmission of said first outgoing uncoded optical interrogation signal by said light transmitter means.

7. The identification of friend from foe apparatus of claim 1 wherein
    said radio receiver means is responsive to said radio transmitter means and is enabled to receive a said first outgoing coded radio-frequency interrogation signal during a first period of time following said first outgoing uncoded optical interrogation signal sent out by said light transmitter means and
    said radio receiver means is responsive to said radio transmitter means and is enabled to receive said incoming coded radio-frequency response signal within a second period of time following the first period of time.

8. A communication and identification of friend or foe apparatus comprising in combination,
    radio transmitter means for sending out an outgoing coded radio-frequency communication signal that is not spatially selective and an outgoing coded radio-frequency interrogation signal that is not spatially selective; and
    radio receiver means for receiving an incoming coded radio-frequency interrogation signal that is not spatially selective; and
    light receiver means for receiving an incoming uncoded, spatially selective optical interrogation signal;
    wherein said radio receiver means is responsive to said light receiver means and is enabled to receive said incoming radio-frequency interrogation signal for a first period of time following the reception of said incoming uncoded, spatially selective optical interrogation signal by said light receiver means.

9. The communication and identification of friend from foe apparatus of claim 8
    wherein said light receiver means includes a display for the direction from which the light was received.

10. The communication and identification of friend from foe apparatus of claim 8
    wherein said radio receiver means further comprises means to determine whether or not an incoming coded radio frequency signal received within said first period of time is a valid interrogation signal and
    said radio transmitter means sends out an outgoing coded said radio-frequency response signal within a second period of time following the reception by said radio receiver means of a such said valid interrogation signal within said first period of time.

* * * * *

UNITED STATES PATENT AND TRADEMARK OFFICE
CERTIFICATE OF CORRECTION

PATENT NO. : 5,170,168
DATED : December 8, 1992
INVENTOR(S) : Dieter Roth

It is certified that error appears in the above-indentified patent and that said Letters Patent is hereby corrected as shown below:

On the title page: Item [30] Foreign Patent Documents, Col. 2, line 3, change "2215453" to --2215463 --.

Column 1, lines 66 and 67, change "DRAWIN-g" to -- DRAWING--.

Signed and Sealed this

Twenty-sixth Day of October, 1993

Attest:

BRUCE LEHMAN

*Attesting Officer*     *Commissioner of Patents and Trademarks*